E. C. HEAD.
INTERCHANGEABLE POSITIVE AND FRICTION DRIVE AND REVERSIBLE GEARING FOR MACHINE TOOLS.
APPLICATION FILED NOV. 10, 1917.

1,349,958.

Patented Aug. 17, 1920.
5 SHEETS—SHEET 4.

INVENTOR
Ernest C. Head
BY
Mauro, Cameron, Lewis
& Massie, ATTORNEYS.

UNITED STATES PATENT OFFICE.

ERNEST C. HEAD, OF VAN WERT, OHIO, ASSIGNOR TO COLBURN MACHINE TOOL COMPANY, OF FRANKLIN, PENNSYLVANIA, A CORPORATION OF PENNSYLVANIA.

INTERCHANGEABLE POSITIVE AND FRICTION DRIVE AND REVERSIBLE GEARING FOR MACHINE-TOOLS.

1,349,958.   Specification of Letters Patent.   Patented Aug. 17, 1920.

Application filed November 10, 1917. Serial No. 201,246.

*To all whom it may concern:*

Be it known that I, ERNEST C. HEAD, a citizen of the United States of America, and a resident of Van Wert, Van Wert county, Ohio, have invented a new and useful Improvement in Interchangeable Positive and Friction Drives and Reversible Gearings for Machine-Tools, which invention is fully set forth in the following specification.

This invention relates to gear-trains for machine tools and, while capable of a variety of uses, has especial utility when applied to the train of driving gears of a feed element thereof.

An object of this invention is to provide a feed element of a machine tool with an improved train of driving gears whereby such feed element may be driven through either a frictional or a positive connection at will.

Another object of this invention is to provide a feed element of a machine tool with a train of driving gears whereby such element may be driven in either direction through a positive connection as well as driven through a frictional connection.

Yet another object of this invention is to provide a feed element of a machine tool with an improved train of driving gears whereby, through the use of substitutible gears, the feed ratio of said element may be varied at will.

A further object of this invention is to provide a feed element of a machine tool with a train of driving gears whereby the feed ratio of such element may be varied at will, whether the feed element be driven through a frictional connection or a positive connection, and whether, when driven through a positive connection, it be driven in one direction or the other.

Yet another object of the invention is to provide, in the driving train of a machine tool, a friction clutch, a positive clutch, and improved means whereby either of said clutches may be interposed in said train at will.

Another object of the invention is to provide a feed element of a machine tool with a driving train comprising a friction clutch together with means whereby the friction connection provided by such clutch may be rendered a positive connection at the will of the operator.

Other objects relate to the provision of mechanism of the type referred to which is simple in construction, easily understood, readily and conveniently manipulated, and efficient in operation.

Stated broadly, the invention comprises, in combination with a feed element of a machine tool, a driving train therefor comprising means for frictionally driving said feed element and means for positively driving said feed element in either direction, said frictionally-driven means and said positively-driven means being selectively interchangeable in the drive of said feed element, together, preferably, with means whereby the feed ratio of said element may be varied at will.

More specifically, my invention comprises a feed train provided with a frictionally-driven shaft, one or more positively-driven shafts, preferably two positively-driven shafts rotating reversely, and a gear adapted to be mounted on any of said shafts in motion-transmitting relation to said feed train. A gear in said train is preferably reversible on its shaft and readily removable therefrom for substitution by any one of a plurality of gears, and provision is also made for supporting in said train any one of a second plurality of gears in mesh with its complementary gear of said first group. My invention also comprises a driving train provided with a friction clutch, a single-driving-relation positive clutch, and means, preferably a transposable member, for selectively interposing the friction clutch or the positive clutch in said driving train. In the embodiment shown, said positive clutch is designed to lock together the members of the friction clutch to constitute the same a positive driving connection in said train. Said transposable member may be and, in the embodiment shown on the drawings, is a shiftable member of change-speed gearing, and said friction clutch, the clutch for selectively interposing in said drive train either a fast driving element or a slow driving element. This latter subject matter is only claimed generically or in combination herein, being claimed specifically in a division of this application Serial No. 296,128, filed May 10, 1919.

The invention is capable of receiving a variety of mechanical expressions, one of which is shown on the accompanying drawings, but it is to be expressly understood that the drawings are for the purpose of illustration only and are not to be construed as a definition of the limits of the invention, reference being had to the appended claims for that purpose.

In said drawings:—

Referring in detail to said drawings, wherein the same reference characters designate corresponding parts in the several figures, the invention is shown as applied to the feed train of the ram of a vertical boring and turning mill, but it is to be expressly understood that the invention is not restricted in use to such an application but is capable of a wide variety of uses.

In order to adapt a machine tool of the type illustrated so that the vertically movable tool-carrying element or ram may be used in cutting threads, it is necessary that all friction transmissions be eliminated from the feed train of said ram, and, inasmuch as the construction illustrated employs a friction drive when reversing the general utility feed of the ram, it is necessary that means be provided whereby the special or thread-cutting feed may be reversed so as to adapt the machine for cutting both right-hand and left-hand threads. It is furthermore necessary that provision be made for supplying the various feed ratios used for cutting threads of different leads.

Figure 1:
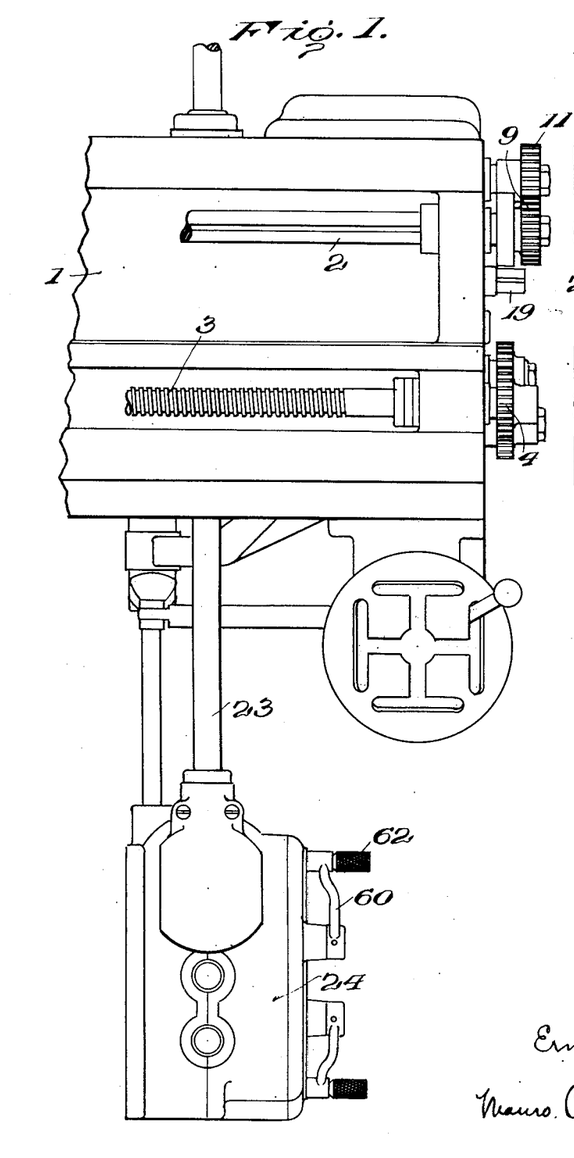
Figure 1 is a front elevation of one end of the cross-rail and related feed box of a vertical boring and turning mill equipped with my improved gearing.
Figure 2:
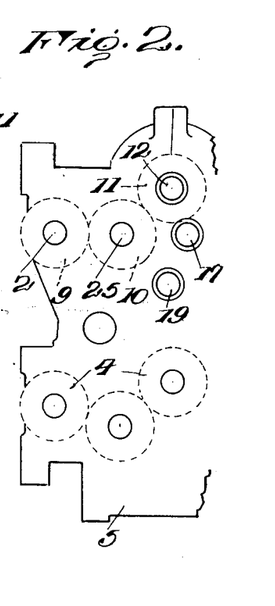
Fig. 2 is an end view of said rail.

Referring to Fig. 1, one end of the cross-rail is shown at 1, said rail having suitably mounted therein the rotatable feed shaft 2 which effects the feed of the ram (not shown) and the rotatable feed screw 3 which effects the feed of the saddle (not shown). The term "feed element" will hereafter be used to designate either the feed shaft or the feed screw, or any suitable element in the driving train thereof. Inasmuch, however, as the new gearing will seldom be applied to the drive of the feed screw, the same may be omitted from further consideration except to point out that the same is driven through the train of gears 4 (Fig. 3) on the outside of gear case 5, said train being driven in one or the other direction by the one or the other of two trains of gears 6 and 7 within said case, either of said trains 6 and 7 being operatively connected with said train 4 by a clutch 8. Said driving train for the feed screw may desirably be of the construction disclosed in my application Serial No. 208,129, filed Dec. 20, 1917.

In the form shown, feed shaft 2 projects beyond the end of rail 1 and has keyed thereto a readily removable gear 9 which meshes with a gear 10 driven by a gear 11 rotatably fixed to but readily removably from the exteriorly projecting end of the shaft 12 which, within the gear case 5, carries two freely-rotatable gears 13 and 14. Shaft 12 and therefore gear 11 may be selectively driven through either of gears 13 or 14 by operation of a friction clutch 15 splined to said shaft 12. Gear 13 meshes with a gear 16 fixed to a shaft 17, gear 16 in turn meshing with a gear 18 fixed to a shaft 19. Gear 14 meshes with a gear 20 also fixed to said shaft 19. Shaft 19 also carries a bevel gear 21 in mesh with a bevel gear 22 splined to the vertical shaft 23 which transmits power from the feed gearing contained in the feed box 24. It will therefore be seen that, while shaft 12 is a frictionally driven shaft, shafts 17 and 19 are both positively driven shafts and rotate in reverse directions.

Figure 3:
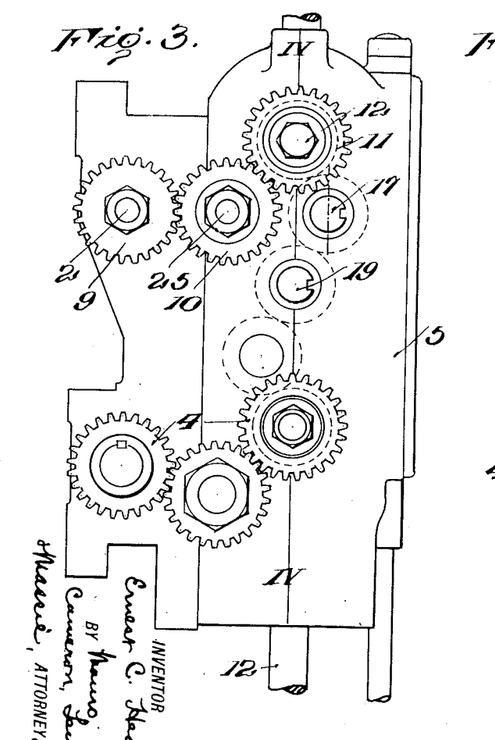
Fig. 3 is an enlarged end view of said rail and the gear case carried thereby.
Figure 4:
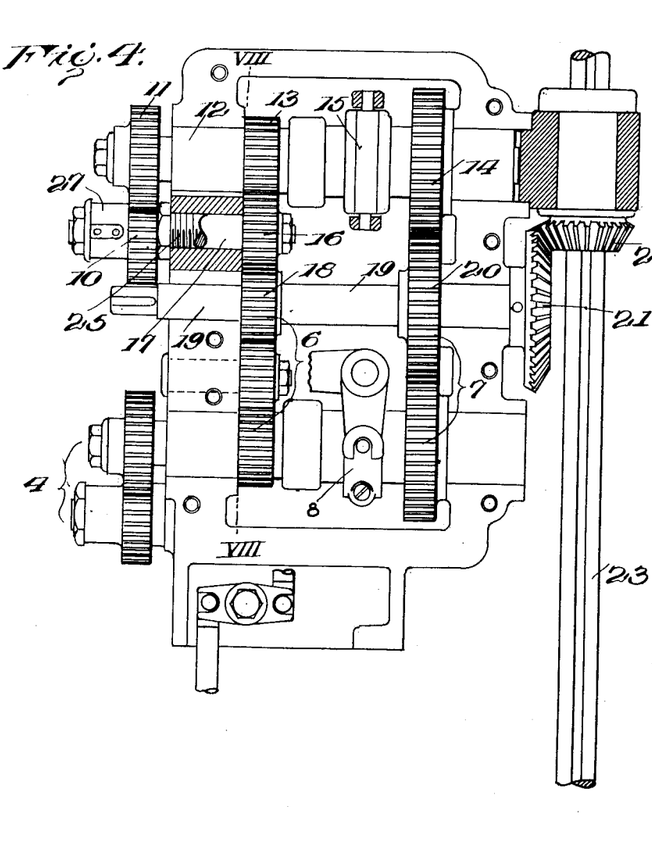
Fig. 4 is a section on the line 4—4 of Fig. 3 showing in elevation the gearing contained in said gear case.
Figure 9:
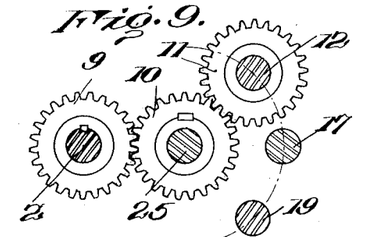
Figs. 9, 10, 11, 12, 13 and 14 are diagrammatic views showing different arrangements of the gears on the outside of said case.

Referring to Figs. 8 to 14 inclusive, it will be perceived that the shafts 12, 17 and 19 are so arranged that their centers lie on the arc of a circle struck from the center of the stub-shaft or pin 25 on which is keyed the gear 10. When the feed element is to be driven through a frictional connection, gear 11 is left on shaft 12 and the arrangement of gears 9, 10 and 11 is as shown in Figs. 3 and 9. When it is desired to utilize a positive drive for the feed element, however, gear 11 is removed from shaft 12 and placed upon shaft 17, which is positively driven, where it is still in mesh with gear 10 (see Fig. 11). In case the feed element is to be positively driven but in the opposite direction, gear 11 is placed on shaft 19, which is positively driven, where it is still in mesh with gear 10 (see Fig. 13).

Figure 10:
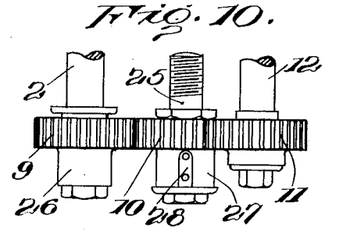
Figure 11:
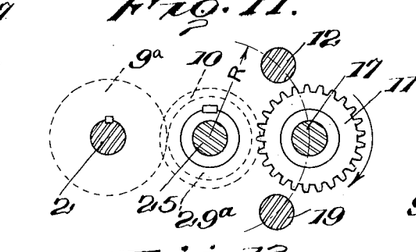
Figure 12:
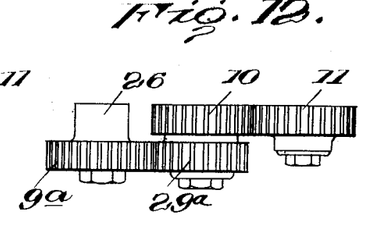
Figure 13:
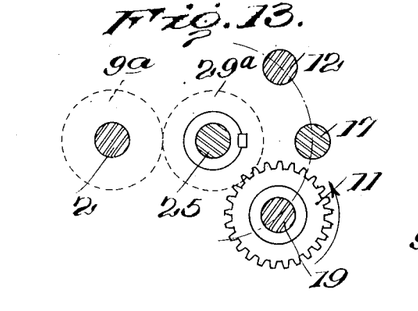
Figure 14:
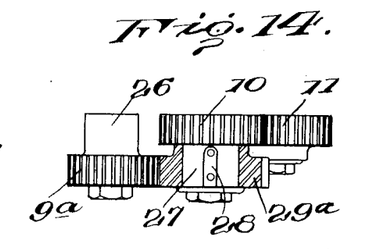

Referring to Fig. 10, gear 9 is shown as provided with an elongated hub 26, said gear being reversible whereby it may be removed and placed on its shaft, i. e., the feed element 2, with its hub 26 disposed inwardly. Gear 10 is also provided with an elongated hub 27 which carries a key 28 whereby a complementary gear 29 may be supported thereon in mesh with gear 9 when reversed, or any one of a plurality of substitutible gears 29ª may be supported thereon in mesh with its complementary gear from a second plurality of substitutible gears 9ª when the latter is substituted for gear 9 (see Figs. 11 to 14). Therefore, by properly selecting complementary gears 9ª and 29ª of suitable ratio, any desired feed ratio of the feed element 2 may be obtained, and said feed element may be driven through a frictional connection or through a positive connection in either direction.

Figures 15, 16, 17:
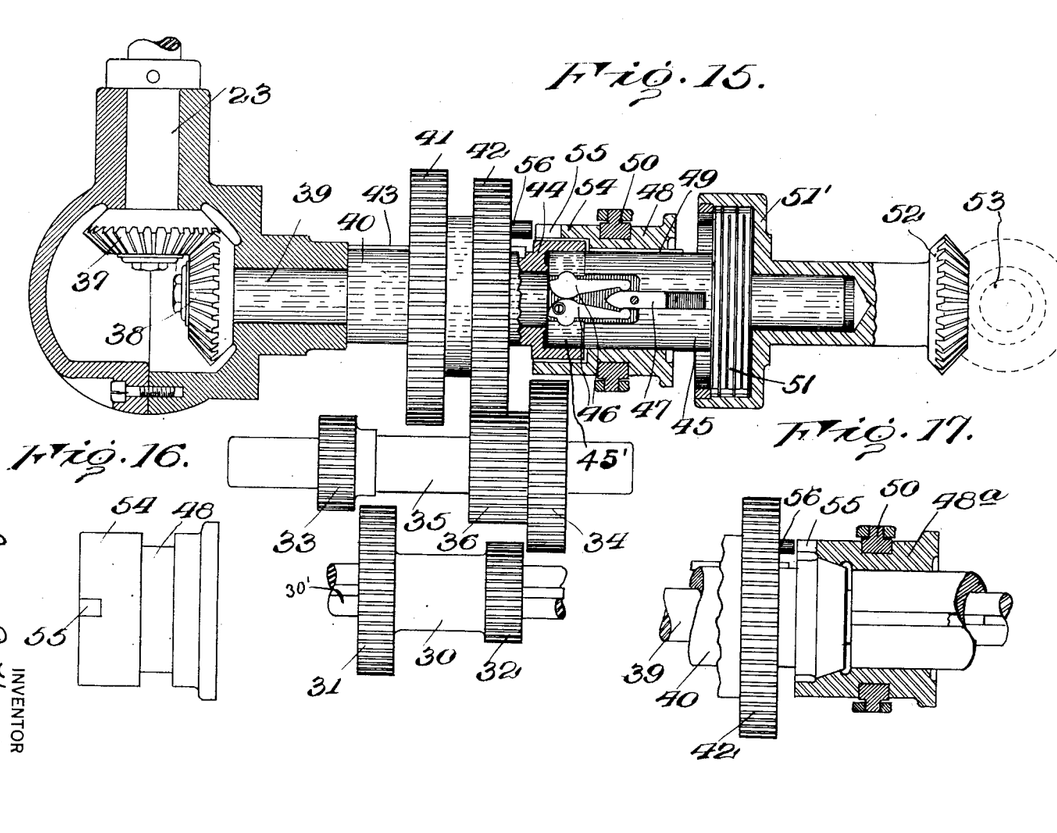
Fig. 15 is an elevation of a portion of the gearing in the feed box.
Fig. 16 is a detail of the clutch sleeve.
Fig. 17 is a detail of an alternative construction of friction clutch.

Referring to Fig. 15, there is shown a portion of the feed gears within the feed box 24. Said feed gears may be of any suitable construction such, for example, as disclosed in my application Serial No. 201,245, filed Nov. 10, 1917.

In the form shown, said feed gearing comprises change-speed gears including a shiftable gear member 30 on a driving shaft 30′, said member 30 carrying gears 31 and 32 adapted to be shifted into engagement respectively with gears 33 and 34 fixed to shaft 35. Shaft 35 may thus be driven from shaft 30′ through either gears 31, 33 or gears 32, 34. Gear 34 has connected thereto, or formed integrally therewith, a gear 36 to be referred to hereinafter.

The lower end of shaft 23 carries a bevel gear 37 which meshes with a bevel gear 38 fixed to a shaft 39. Revolubly mounted on shaft 39 is a sleeve or quill 40 upon which is shiftably mounted a pair of gears 41 and 42, together constituting a gear member which is keyed to said sleeve 40 by the spline 43. The sleeve 40 at one end is enlarged to provide a hub 44 designed to be engaged by one end of a double friction clutch. In the form shown in Fig. 15, said double friction clutch comprises a body 45 keyed to the shaft 39 and provided with a resilient member or members 45′ designed to be forced into clutching engagement with hub 44 by the operation of arms 46, said arms in turn being operated by a slidable member 47 carried by the shipper sleeve 48 splined to said clutch body as shown at 49. 50 designates the clutch-shifting yoke. In place, however, of a friction clutch of the type described, any other suitable form of friction clutch may be employed, such, for example, as is shown in Fig. 17. The opposite end of the shipper sleeve 48 is designed to operatively engage the multiple-disk clutch 51, shown as comprising friction disks or rings fixed respectively to the clutch body 45 and the enlarged hub 51′ of the bevel gear 52. Said bevel gear 52 is driven from a shaft 53 which constitutes the rapid drive for the feed element whereby to secure the rapid traverse movements of the tool. The clutch 51 may suitably be of the construction disclosed in the patent of Frederick F. Clarke, No. 1,188,041, granted June 20, 1916, but a friction clutch of any other suitable construction may be employed instead.

Figures 5, 6, 7:
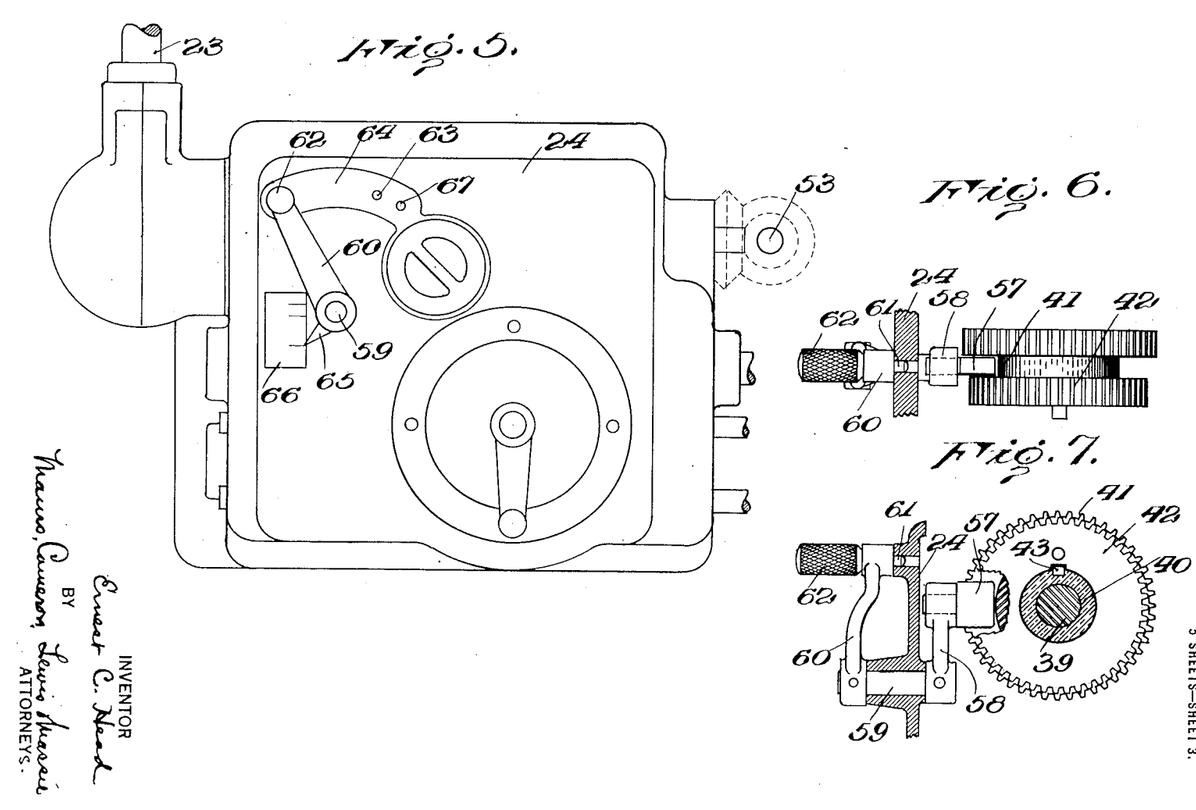
Fig. 5 is a front elevation of the feed box.
Figs. 6 and 7 are details of the transposable member and its actuating means.
Figure 8:
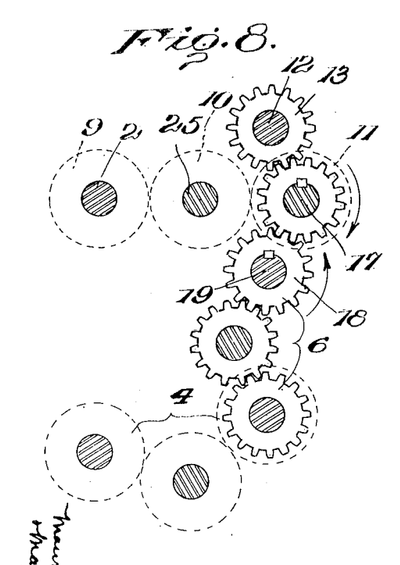
Fig. 8 is a diagrammatic view of certain gears within the gear case taken on the line 8—8 of Fig. 4, the gears on the outside of said case being shown in dotted lines.

To eliminate the friction drive provided by clutch 45′ when the machine tool is to be used for thread-cutting, a positive clutch is provided to be interposed in the drive of shaft 23. Furthermore, a definite and invariable driving relation is always maintained between the rotation of shaft 30′ and the work support; therefore in order that the thread-cutting tool may never get out of alinement with the thread that is being cut when the tool is returned to any preceding part of the thread, it is necessary that such positive clutch have but a single driving relation between its members. To this end, the shipper sleeve 48 is provided with a tubular extension 54 in which is formed a single notch or pocket 55 adapted for the reception of a pin 56 shown as carried on gear 42. The gears 41 and 42 are designed to be shifted on sleeve 40 to mesh with gears 33 and 36 respectively whereby the sleeve 40 may be driven from shaft 35 through either gears 33, 41 or gears 36, 42, and to shift said gears 41 and 42, a tongue 57 is engaged in the annular space between said gears, said tongue being pivotally mounted on an arm 58 pinned to an arbor 59 which extends to the exterior of feed box 24, where it is provided with a crank arm 60. Crank arm 60 is preferably provided with a plunger 61 having a knurled handle 62, said plunger being designed to engage in either of two holes 63 on a sector or radius plate 64 (see Fig. 5 wherein one of said holes is directly beneath the handle 62). Crank 60 may also be provided with a pointer 65 for coaction with marks on an index plate 66.

To move pin 56 to a position wherein it may engage with notch 55, the gear member 41—42 may be moved to a position beyond that of normal engagement with gear 36 in the operation of the change-speed gearing per se. To this end, gear 36 is made wider than gear 42 so that the latter gear may be moved into either the position shown in Fig. 15, or until the face of gear 42 engages the adjacent face of gear 34. In the latter position pin 56 may occupy the notch 55 in sleeve 54, thereby constituting therewith a one-tooth positive clutch. Under such conditions, the clutch body 45 is positively locked to the sleeve 40 through the interlock provided by said pin 56 and notch 55 carried respectively by members splined to the clutch halves. Radius plate 64 is provided with a further hole 67 with which the plunger 61 engages when gear member 41—42 is moved to provide the positive driving connection heretofore described, and index plate 66 may also be provided with a suitable line or character to indicate such position by coaction with the pointer 65.

In operation, when the general utility feed is to be employed, gear 11 is mounted on shaft 12 to drive the feed element through the friction connection 15, and shipper sleeve 48 may be shifted by yoke 50 to engage friction clutch 45' with hub 44 or to operate friction clutch 51, as it is desired to drive the feed element through the change-speed gearing, which constitutes a slow drive for the feed element and secures normal feeding movements thereof, or from the shaft 53, which constitutes a fast drive for the feed element and secures the rapid traverse movements thereof. When it is desired to cut a screw-thread, gear 11 is removed from shaft 12 and placed upon shaft 17 or shaft 19 according to the direction of the thread to be cut, and, if the gear ratio represented by the gears 9—10 is not proper for the particular thread to be cut, gear 9 is substituted by a proper gear $9^a$ mounted reversely on its shaft 2, and the complementary gear $29^a$ is mounted on hub 27 of gear 10. Crank 60 is then moved to engage its plunger 61 in hole 67 whereby gear 42 is moved into mesh with gear 36 with its face against the adjacent face of gear 34 and its pin 56 engaged in, or in position to be engaged with, the notch 55 in shipper sleeve 48. Thereby are both friction transmissions eliminated from the drive of the feed element during the feeding movements of the tool, while rapid traverse movements of the tool may be secured by moving shipper sleeve 48 to operate the friction clutch 51, at which time pin 56 is out of engagement with notch 55.

By the use of a one-tooth positive clutch in the driving connection of the feed element, it will be apparent that the thread-cutting tool will never get out of its proper alinement with the thread being cut when traversed from one portion of the thread to another.

While the embodiment illustrated on the drawings discloses the application of the present invention only to the drive of the feed rod of a vertical boring and turning mill, it is to be expressly understood that the invention is not to be restricted to such an application thereof but may be used in the driving train of any feed element of any machine tool to secure equal or similar functions or advantages. Furthermore, while the illustrated embodiment of the invention embraces mechanisms for selectively changing from a friction to a positive drive at two places in the driving train, it is to be expressly understood that the invention is not to be restricted to the use of both of said mechanisms together, since each may be used under suitable conditions independently of and separately from the other. Nor is the invention to be restricted to the precise details of construction and arrangement illustrated on the drawings, as the invention is capable of receiving a variety of mechanical expressions some of which will readily suggest themselves to those skilled in the art, while certain features thereof are capable of use without other features thereof. Reference is therefore to be had to the appended claims for a definition of the limits of the invention.

What is claimed is:—

1. An interchangeable positive and friction drive for machine tools, comprising a feed element, a driving element, means adapted to be frictionally-driven for transmitting motion from said driving element to said feed element, means adapted to be positively-driven for transmitting motion in either direction of shaft rotation from said driving element to said feed element, and means to selectively interpose either of said frictionally-driven or positively-driven means in the drive of said feed element.

2. An interchangeable positive and friction drive for machine tools comprising a feed element, a driving element, means adapted to be frictionally-driven for transmitting motion from said driving element to said feed element, and means adapted to be positively-driven for transmitting motion in either direction of shaft rotation from said driving element to said feed element, said frictionally-driven and positively-driven means being selectively interchangeable in the drive of said feed element.

3. An interchangeable positive and friction drive for machine tools comprising a feed element, a driving element, means for frictionally driving said feed element from said driving element, means for positively driving said feed element from said driving element in either direction of shaft rotation, and a transposable member for selectively interposing either of said means in the drive of said feed element.

4. In a machine tool, a feed element, a driving element, and a train of gearing adapted to transmit motion from said driving element to said feed element, said train of gearing comprising a frictionally-driven shaft, a positively-driven shaft, and a transposable gear adapted to be mounted on either of said shafts in motion-transmitting relation to said train whereby said feed element may be driven through a friction drive or a positive drive.

5. In a machine tool, a feed element, a driving element, and a train of gearing adapted to transmit motion from said driving element to said feed element, said train of gearing comprising a frictionally-driven shaft, a plurality of positively-driven reversely-rotating shafts, and a transposable gear adapted to be mounted on any of said shafts in motion-transmitting relation to said train whereby said feed element may be driven through a friction drive or in either direction through a positive drive.

6. In a machine tool, a feed element, a driving element, and a train of gearing adapted to transmit motion from said driving element to said feed element, said train of gearing comprising a driven gear, a frictionally-driven shaft, a positively-driven shaft, and a transposable gear adapted to be mounted on either of said shafts in mesh with said driven gear whereby said feed element may be driven through a friction drive or a positive drive.

7. In a machine tool, a feed element, a driving element, and a train of gearing adapted to transmit motion from said driving element to said feed element, said train of gearing comprising a driven gear, a frictionally-driven shaft, a plurality of positively-driven reversely-rotating shafts, and a transposable gear adapted to be mounted on any of said shafts in mesh with said driven gear whereby said feed element may be driven through a friction drive or in either direction through a positive drive.

8. In a machine tool, a feed element, a driving element, and a train of gearing adapted to transmit motion from said driving element to said feed element, said train of gearing comprising a frictionally-driven shaft, a positively-driven shaft, a transposable gear adapted to be mounted on either of said shafts in motion-transmitting relation to said train, and means whereby the ratio of said drive may be varied.

9. In a machine tool, a feed element, a driving element, and a train of gearing adapted to transmit motion from said driving element to said feed element, said train of gearing comprising a frictionally-driven shaft, a plurality of positively-driven reversely-rotating shafts, a transposable gear adapted to be mounted on any of said shafts in motion-transmitting relation to said train, and means whereby the ratio of said drive may be varied.

10. In a machine tool, a feed element, a driving element, and a train of gearing adapted to transmit motion from said driving element to said feed element, said train of gearing comprising a frictionally-driven shaft, a positively-driven shaft, a transposable gear adapted to be mounted on either of said shafts in motion-transmitting relation to said train, a driven element in said train adapted to support in operative relation to said train any one of a plurality of substitutible gears, and a second element in said train constructed to support any one of a plurality of substitutible gears in mesh with its complementary gear on said driven element.

11. In a machine tool, a feed element, a driving element, and a train of gearing adapted to transmit motion from said driving element to said feed element, said train of gearing comprising a frictionally-driven shaft, a plurality of positively-driven reversely-rotating shafts, a transposable gear adapted to be mounted on any of said shafts in motion-transmitting relation to said train, a driven element in said train adapted to support in operative relation to said train any one of a plurality of substitutible gears, and a second element in said train constructed to support any one of a plurality of substitutible gears in mesh with its complementary gear on said driven element.

12. In a machine tool, a feed element, a driving element, and a train of gearing adapted to transmit motion from said driving element of said feed element, said train comprising a frictionally-driven shaft, a positively-driven shaft, a transposable gear adapted to be mounted on either of said shafts in motion-transmitting relation to said train, a reversible gear in said train, and an element in said train constructed to support a gear in mesh with said last-named gear when reversed.

13. In a machine tool, a feed element, a driving element, and a train of gearing adapted to transmit motion from said driving element to said feed element, said train comprising a frictionally-driven shaft, a plurality of positively-driven reversely-rotating shafts, a transposable gear adapted to be mounted on any of said shafts in motion-transmitting relation to said train, a reversible gear in said train, and an element in said train constructed to support a gear in mesh with said last-named gear when reversed.

14. In a machine tool, a feed element, a driving element, and a train of gearing adapted to transmit motion from said driving element to said feed element, said train of gearing comprising a gear having a hub adapted to support any one of a plurality of substitutible gears in driving relation to said train, a driven element in said train adapted to support a substitutible gear in mesh with a gear on the hub of said first-named gear, a frictionally-driven shaft, a positively-driven shaft, and a transposable gear adapted to be mounted on either of said shafts in motion-transmitting relation to said train.

15. In a machine tool, a feed element, a driving element, and a train of gearing adapted to transmit motion from said driving element to said feed element, said train of gearing comprising a gear having a hub adapted to support any one of a plurality of substitutible gears in driving relation to said train, a driven element in said train adapted to support a substitutible gear in mesh with a gear on the hub of said first-named gear, a frictionally-driven shaft, a plurality of positively-driven reversely-rotating shafts, and a transposable gear adapted to be mounted on any of said shafts in motion-transmitting relation to said train.

16. In a machine tool, a feed element, a driving element, and a train of gearing adapted to transmit motion from said driving element to said feed element, said train of gearing comprising means constructed to support any one of a plurality of substitutible gears in driving relation to said train, means adapted to support any one of a plurality of substitutible gears in mesh with its complementary gear on said first-named means, a frictionally-driven shaft, a positively-driven shaft, and a transposable gear adapted to be mounted on either of said last-named shafts in motion-transmitting relation to said train.

17. In a machine tool, a feed element, a driving element, and a train of gearing adapted to transmit motion from said driving element to said feed element, said train of gearing comprising means constructed to support any one of a plurality of substitutible gears in driving relation to said train, means adapted to support any one of a plurality of substitutible gears in mesh with its complementary gear on said first-named means, a frictionally-driven shaft, a plurality of positively-driven reversely-rotating shafts, and a transposable gear adapted to be mounted on any of said last-named shafts in motion-transmitting relation to said train.

18. In a machine tool, a feed element, a driving element, and a train of gearing adapted to transmit motion from said driving element to said feed element, said driving train comprising a gear having a hub constructed to support any one of a plurality of substitutible gears in driving relation to said train, a shaft, a substitutible gear removably mounted on said shaft in mesh with a gear on the hub of said first-named gear, and means adapted to drive said gears either positively or frictionally.

19. In a machine tool, a feed element, a driving element, and a train of gearing adapted to transmit motion from said driving element to said feed element, said driving train comprising a member constructed to support any one of a plurality of substitutible gears in driving relation to said train, a shaft, a reversible substitutible gear having an elongated hub, said last-named gear being removably mounted on said shaft in mesh with a gear on said member, and means adapted to drive said gears either positively or frictionally.

20. In a machine tool, a feed element, a driving element, and a train of gearing adapted to transmit motion from said driving element to said feed element, said driving train comprising a gear having a hub constructed to support any one of a plurality of substitutible gears in driving relation to said train, a shaft, a substitutible gear removably mounted on said shaft in mesh with a gear on the hub of said first-named gear and readily removable therefrom for substitution by a different gear complementary to a different gear on said means, and means adapted to drive said gears either positively or frictionally.

21. An interchangeable positive and friction drive for machine tools comprising a feed element, a driving element, a driving train for transmitting motion from said driving element to said feed element including frictional driving connections, and a plurality of transposable members for eliminating said frictional driving connections and interposing positive driving connections in said train.

22. An interchangeable positive and friction drive for machine tools comprising a driven element, a driving element, and a train for transmitting motion from said driving element to said driven element, said train comprising a plurality of frictional driving connections and a plurality of positive driving connections selectively interposable in said train in place of said frictional driving connections.

23. An interchangeable positive and friction drive for machine tools comprising a driven element, a driving element, a driving train between said elements comprising a plurality of frictional driving connections, and means whereby positive driving connections may be substituted for all said frictional driving connections.

24. An interchangeable positive and friction drive for machine tools comprising a driven element, a driving element, and a driving train between said elements including a frictionally driven shaft, a positively driven shaft, a friction clutch in the drive of said shafts, a transposable gear adapted to be mounted on either of said shafts in motion-transmitting relation to said train, and means to interpose in said train a positive clutch in place of said friction clutch.

25. An interchangeable positive and friction drive for machine tools comprising a feed element, a driving element, and a driving train for transmitting motion from said driving element to said feed element, said train comprising a shaft carrying a gear, frictionally and positively driven shafts arranged on an arc struck from said first-named shaft, and a gear mountable on any of said last-named shafts in mesh with the gear on said first-named shaft.

26. An interchangeable positive and friction drive for machine tools comprising a feed element, a driving element, and a driving train for transmitting motion from said driving element to said feed element, said train comprising a shaft carrying a gear, a frictionally driven shaft, two reversely-rotating positively-driven shafts, said frictionally and positively driven shafts being arranged on an arc struck from said first-named shaft, and a gear mountable on any of said last-named shafts in mesh with the gear on said first-named shaft.

27. In a machine tool, a feed element, a driving element, and a train of gearing adapted to transmit motion from said driving element to said feed element, said train comprising a relatively fixed gear having a hub constructed to support any one of a plurality of substitutible gears in driving relation to said train, and a relatively fixed shaft adapted to support removably any one of a plurality of substitutible gears in mesh with its complementary gear on said hub.

In testimony whereof I have signed this specification.

ERNEST C. HEAD.